United States Patent Office 3,505,363
Patented Apr. 7, 1970

3,505,363
TERTIARY ALKYL AND TERTIARY ARALKYL PEROXIDES
Nicholas A. Milas, Belmont, Mass., assignor to Massachusetts Institute of Technology, Cambridge, Mass., a corporation of Massachusetts
No Drawing. Continuation-in-part of application Ser. No. 337,757, Jan. 15, 1964. This application Jan. 29, 1968, Ser. No. 701,137
Int. Cl. C07c 73/00, 73/02, 73/10
U.S. Cl. 260—389                4 Claims

ABSTRACT OF THE DISCLOSURE

Tertiary alkyl and tertiary aralkyl peroxides useful as polymerizing catalysts and as oxidizing agents. The peroxides are produced by a solvolysis reaction between an excess of tertiary lower alkyl hydroperoxide and a tertiary alkyl-, a tertiary aralkyl-, or an organic acid-chloride, wherein improved yields are obtained by maintaining the reactants under a partial vacuum during the time that hydrogen chloride is formed. Removal of the hydrogen chloride prevents it from causing decomposition of the tertiary lower alkyl hydroperoxide.

SPECIFICATION

This application is a continuation-in-part of Ser. No. 337,757, filed Jan. 15, 1964 now abandoned. This invention relates to peroxides and peroxyesters and a method for producing the same.

The peroxides and peroxyesters of the present invention have numerous industrial uses as polymerizing catalysts and as oxidizing agents in chemical reactions. Those peroxides and peroxyesters with high melting points have valuable properties as cross-linking catalysts for polyesters, polyethylene, polypropylene and the like.

Peroxides of the type discussed herein have been produced heretofore by reacting the corresponding t-alkyl or t-aralkyl chlorides or sulfates or acid chlorides with t-butyl hydroperoxide in the presence of an inorganic or organic base to neutralize the hydrogen chloride which is formed. Neutralization of the acid has been necessary because the hydroperoxide is destroyed by acidic conditions. The presence of a base however leads to considerable expense in its cost, and in the cost of its subsequent removal and the removal of the salts formed during the reaction.

It is, therefore, an object of this invention to provide an improved process whereby organic peroxides and peroxyesters including di-t-alkyl and mixed t-alkyl-t-aralkyl peroxides, and t-alkyl peroxyesters are produced in substantial yields in the absence of alkalis.

More specifically, it is an object of the present invention to provide an improved process whereby peroxides and peroxyesters of the type discussed herein are produced by contacting or solvolyzing directly, in the absence of alkalis, t-alkyl, t-aralkyl and acid chlorides with tertiary alkyl hydroperoxides, without subjecting the hydroperoxide to the destructive effects of acidic conditions.

A further object of the invention is to produce peroxides and peroxyesters which are relatively free from foreign products.

A still further object of the invention is to produce novel peroxides and peroxyesters.

Other objects of the invention will become apparent from the detailed description and examples which follow.

In accordance with the present invention, a tertiary alkyl chloride or polychloride or a tertiary aralkyl chloride or polychloride is reacted with at least an equivalent and preferably with a stoichiometric excess of a tertiary alkyl hydroperoxide of the same or different radicals under reduced pressure to effect the prompt removal of acidic gases, to produce di-tertiary peroxides and mixed tertiary alkyl-tertiary aralkyl peroxides, and peroxyesters.

I have found that tertiary alkyl hydroperoxides may be reacted with tertiary chlorides in which the chlorine atom is attached to a tertiary carbon atom or polychloro compounds in which the chlorine atoms are activated by unsaturated groups such as benzene rings, double bonds, and the like, or acid chlorides with prompt removal of the acidic vapor from the reaction mixture to produce novel compounds and unexpected results.

My method inhibits or prevents the destruction of all or part of the reaction by acidic vapors and further obviates the need for employing base and its subsequent removal together with base salts. My method also makes possible the production of compounds not produced in substantial yields heretofore even in the presence of base.

The term acid chloride, as herein used, is intended to include not only di-carboxylic acid chlorides of the general formula

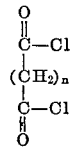

in which $n$ is a whole number from 1 to 10, but also monocarboxylic acid chlorides of the general formula

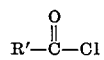

wherein R' is a hydrocarbon radical.

The reaction temperatures vary with the particular reactants involved. The more violent the reaction, the lower the reaction temperature which is required. The vacuum required in the reaction also varies with the reactants used and is critical, being generally within the range of 50–70 mm. Hg. at reaction temperatures generally between 0° and 70° C. The acidic vapors generated or within the presence of the reaction mixture must be promptly removed before the reaction is inhibited or destroyed. This requires that the removal of the acidic gas be effected before it can itself react with the reactants or the reaction products. The greater the amount of acidic gas in the presence of the reaction mixture, the faster must be its removal. Hydrogen chloride, for example, a product of the solvolysis reaction of the invention, destroys the tertiary alkyl hydroperoxides, t-butyl hydroperoxide in particular, and must be removed as soon as it is formed if the reaction is to proceed. The amount of hydrogen chloride which is formed and the rate at which it forms determine the extent to which the pressure of the reaction must be reduced within the 50–70 mm. Hg range.

More specifically, the invention may be illustrated by the following equations:

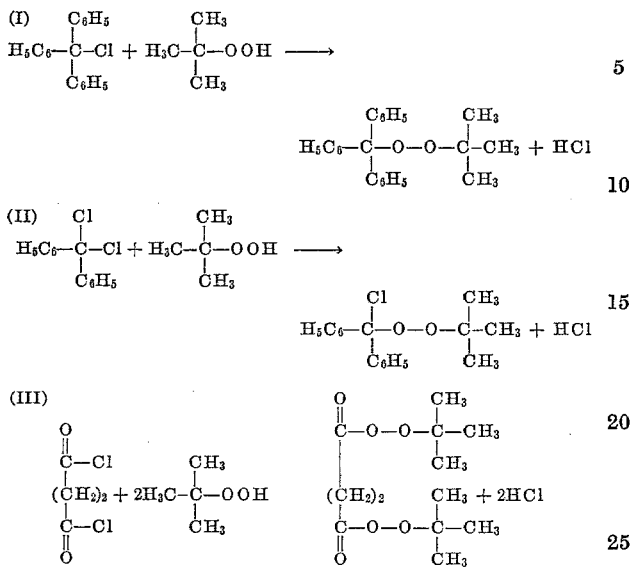

Although, as above indicated, the tertiary alkyl hydroperoxides as a class are operative, t-butyl hydroperoxide is representative of this class, and the specific equations above are not intended to restrict the scope of this invention. The polychloro compounds of this invention are given as examples in which an activated chlorine reacts with t-butyl hydroperoxide to give industrially valuable compounds and the present invention should not be limited to these examples.

The following specific examples will further illustrate the principles of this invention:

EXAMPLE I t-Butyl triphenylmethyl peroxide

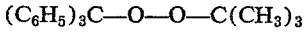

Triphenylmethyl chloride (5 g., 0.0179 mole) was mixed in a round-bottomed-ground-joined flask with 5.8 g. (0.056 mole) of 99.2% t-butyl hydroperoxide and the flask immediately attached to a rotary vacuum (60–70 mm.) evaporator. A rapid evolution of gas took place and the mixture solidified. The mixture was then heated to 50–70° C. for two hours, then subjected to a 2 mm. vacuum for one hour to remove the excess t-butyl hydroperoxide. The crude solid (5.81 g.; 98% yield) had a M.P. of 68–70° C. and was recrystallized from methyl alcohol. Yield of pure product, 5.07 g. (85.5%); M.P. 73° C. (lit., M.P. 72–73° C.).

EXAMPLE II 2,5-dimethylhexan-2,5-di-(triphenylmethyl)-peroxide

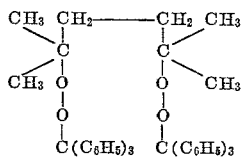

Triphenylmethylchloride (3.12 g., 0.0112 mole) was dissolved in 20 ml. of pure dioxane and to the solution added 1.0 g. (0.0056 mole) of 2,5-dimethylhexan-2,5-dihydroperoxide and the mixture treated as in Example I. At the end of the reaction, the dioxane was removed in vacuum and the solid residue (3.76 g., M.P. 162° C.) recrystallized from ligroin; yield, 93%, M.P. 162–163° C. In another run a quantitative yield was obtained M.P. 162–163° C.

*Analysis.*—Calcd. for $C_{46}H_{46}O_4$ (percent): C, 83.35; H, 7.00. Found (percent): C, 82.99; H, 7.12.

The I.R. spectrum 5% in carbon tetrachloride showed the following bands in cm.$^{-1}$: 3075 (m.); 3050 (s.); 3025 (m., doublet); 2975 (s.); 2923 (m.); 1593 (m.); 1493 (s.); 1450 (s.); 1377 (m.); 1364 (s.); 1225 (s.); 1100 (m.); 1032 (m.); 1000 (m.); 898 (m.); 874 (m.); 702 (s.).

EXAMPLE III

Tetraphenyl-p-xylene-di-t-butyl peroxide

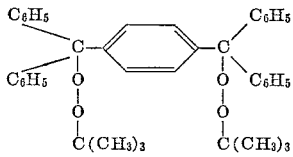

Tetraphenyl-p-xylene-dichloride, M.P. 234–235° (0.5 g.; 0.001 mole), was mixed with 2 g. (0.022 mole) of 99.2% t-butyl hydroperoxide and the mixture subjected immediately to vacuum treatment as in Example I at 55–60° C. After two hours of heating, the mixture was cooled and treated with petroleum ether. The crystals which separated (yield, 90%) were dried and analyzed; M.P. 154–155°.

*Analysis.*—Calcd. for $C_{40}H_{38}O_4$ (percent): C, 81.88; H, 7.22. Found (percent): C, 81.84; H, 7.52.

The I.R. spectrum 5% in carbon tetrachloride exhibited the following bands in cm.$^{-1}$: 3050 (m., triplet); 2974 (s.); 1600 (m.); 1490 (m.); 1453 (s.); 1387 (m.); 1367 (s.); 1200 (s.); 1035 (m.); 1000 (s.); 960 (m.); 900 (m.); 880 (m.); 704 (s.).

All of the above peroxides liberate iodine from acidified potassium iodide or hydrogen iodide solutions, but a quantitative estimation of their active oxygen is meaningless since t-aryl chlorides and even t-aryl alcohols or glycols liberate iodine under the same conditions.

EXAMPLE IV

Diphenyl chloromethyl t-butyl peroxide

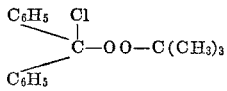

When α,α-dichlorodiphenylmethane was allowed to react with a large excess of 99.2% t-butyl hydroperoxide the reaction was highly exothermic and led to a quantitative formation of benzophenone. However, when an equimolecular amount of t-butyl hydroperoxide was added slowly to α,α-dichlorodiphenylmethane at 0° C. with stirring in the course of 5 hrs. and at 60–70 mm. pressure, diphenyl chloromethyl t-butyl peroxide was formed to the extent of 40–50% as determined by the intensity of a characteristic band in the I.R. spectrum of 1010 cm.$^{-1}$ which increased with time as the bands at 3400 and 3590 cm.$^{-1}$ due to t-butyl hydroperoxide decreased proportionately. On long standing at room temperature this α-chloroperoxide decomposes quantitatively by a free-radical mechanism to benzophenone, t-butyl chloride and hydrogen chloride. However, at room temperature it has an appreciable half-life time which makes it useful as a low temperature polymerization and crosslinking catalyst.

EXAMPLE V

Phenyl dichloromethyl t-butyl peroxide

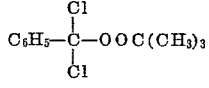

t-Butyl peroxybenzoate

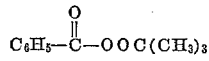

α,α,α-Trichlorotoluene does not react or solvolyze appreciably at room temperature. However, when it was heated at 60–70° C. in a rotary vacuum (60–70 mm.) evaporator with three mole-equivalents of 99.2% t-butyl hydroperoxide a yield of 60% t-butyl peroxybenzoate was obtained as estimated by comparing the intensity of the I.R. band at 1760 cm.$^{-1}$ with that of an authentic sample of t-butyl peroxybenzoate. Since the other products formed were found by the vapor phase chromatography technique to be t-butyl chloride, acetone and hydrogen chloride, in addition to benzoyl chloride, phenyl dichloromethyl t-butyl peroxide must have formed but it decomposed to these products.

This assumption was confirmed when benzoyl chloride was allowed to react under the above conditions with an equimolecular amount of t-butyl hydroperoxide. In this case a quantitative yield of t-butyl peroxybenzoate was obtained.

EXAMPLE VI

Di-t-butyl diperoxysuccinate

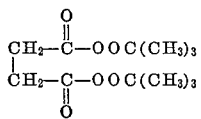

Succinyl chloride (5 g.; .032 mole) was mixed with 12 g. (.134 mole) of 99.2% t-butyl hydroperoxide. The reaction was exothermic and had to be cooled under running cold water. As soon as the reaction subsided (3–4 min.), the flask was attached to a rotary vacuum (60–70 mm.) evaporator. A rapid evolution of gas took place and the mixture almost solidified. The mixture was then heated to 50–60° C. for 3 hours longer under reduced pressure (60–70 mm.) to complete the reaction, then cooled to room temperature and diluted with ether. The ethereal solution was extracted with sodium bicarbonate, dried over magnesium sulfate, filtered and the ether removed in vacuum. A white cotton-like substance was obtained; yield, 6.01 g. (71.2%); M.P. 53–54° C. (lit., 53–54° C.).

EXAMPLE VII

Di-t-butyl diperoxyadipate

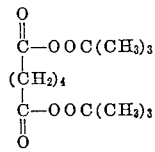

Adipyl chloride (3 g.; .0165 mole) was mixed with 9 g. (.1 mole) of t-butyl hydroperoxide. An exothermic reaction occurred and had to be cooled under running cold water. The mixture was treated and worked up in the same manner as in Example 6. The diperoxyester was obtained as colorless needles; yield, 4.06 g.; 85.3%; M.P. 42–43° C. (lit., 42–45°).

EXAMPLE VIII

Di-t-butyl diperoxyazelate

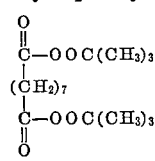

Azelyl chloride (5 g.; .0223 mole) was mixed with 12 g. (.134 mole) of 99.2% t-butyl hydroperoxide. An exothermic reaction took place and the mixture had to be cooled in running water so that the temperature did not rise above 35° C. The reaction mixture became greenish-yellow and when it subsided the flask was attached to the rotary vacuum (60–70 mm.) evaporator and heated for 3 hours at 50–60° C. The product was worked up as in Example 6 but it was obtained as a viscous oil which could not be crystallized; $n_D^{22°}$, 1.4451; yield, 6.9 g. (94.5%). The I.R. spectrum showed two prominent bands at 1780 cm.$^{-1}$ (C=o of perester) and 852 cm.$^{-1}$ (-o-o-band).

*Analysis.*—Calcd. for $C_{17}H_{32}O_6$ (percent): C, 61.42; H, 9.73; O, 9.63. Found (percent): C, 61.19; H, 9.75; O, 9.63.

EXAMPLE IX

Di-t-butyl diperoxysebecate

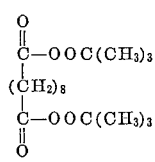

Sebacyl chloride (4.5 g.; .0189 mole), precooled to 0° C., was mixed with 10 g. (0.111 mole) of 99.2% t-butyl hydroperoxide. The reaction as in Example 8 was highly exothermic and had to be cooled for a short time to about 35° C. When the reaction had subsided, the flask was attached to the rotary vacuum (60–70 mm.) and heated for 3 hours at 50–60° C. The reaction mixture was worked up as in Example 6. A colorless viscous oil was obtained which failed to crystallize. Yield, 6.5 g. (93.3%); $n_D^{24°}$, 1.4454. The I.R. spectrum showed two prominent bands at 1780 cm.$^{-1}$ (C=o of perester) and 852 cm.$^{-1}$ (-o-o-band).

*Analysis.*—Calcd. for $C_{13}H_{34}O_6$ (percent): C, 62.39; H, 91.89; O, 9.24. Found (percent): C, 62.15; H, 9.90; O, 9.19.

What is claimed is:
1. 2,5 - dimethylhexan - 2,5-di-(triphenylmethyl)-peroxide.
2. Tetraphenyl-p-xylylene-di-t-butyl peroxide.
3. Diphenyl chloromethyl t-butyl peroxide.
4. Phenyl dichloromethyl t-butyl peroxide.

References Cited

UNITED STATES PATENTS 3,078,306   2/1963   Von Schickh et al. ___ 260—566
3,082,236   3/1963   Mageli et al. _____ 260—453

FOREIGN PATENTS 534,709   12/1956   Canada.
38/2,867   8/1963   Japan.

CHARLES B. PARKER, Primary Examiner

R. L. RAYMOND, Assistant Examiner

U.S. Cl. X.R.

203—91; 252—426; 260—453, 544, 610